(12) United States Patent
Morse

(10) Patent No.: US 7,517,386 B2
(45) Date of Patent: Apr. 14, 2009

(54) FILTER MODULE WITH FLOW CONTROL

(75) Inventor: Thomas C. Morse, Greenville, NC (US)

(73) Assignee: Camfil Farr, Inc., Riverdale, NJ (US)

(*) Notice: Subject to any disclaimer, the term of this patent is extended or adjusted under 35 U.S.C. 154(b) by 549 days.

(21) Appl. No.: 11/118,532

(22) Filed: Apr. 29, 2005

(65) Prior Publication Data

US 2006/0243132 A1     Nov. 2, 2006

(51) Int. Cl.
*B01D 46/00*     (2006.01)

(52) U.S. Cl. .................. 95/22; 95/23; 96/400; 96/421; 96/422

(58) Field of Classification Search .......... 95/23, 95/22; 55/385.2, 270; 73/40.7; 96/420, 96/422, 421
See application file for complete search history.

(56) References Cited

U.S. PATENT DOCUMENTS

| | | | |
|---|---|---|---|
| 2,334,121 A | | 11/1943 | Olshin |
| 2,393,482 A | * | 1/1946 | Smith ..................... 126/295 |
| 2,729,482 A | * | 1/1956 | Kosatka ................... 277/573 |
| 3,819,209 A | * | 6/1974 | Anderson et al. .......... 285/73 |
| 4,000,663 A | * | 1/1977 | Tyler ..................... 74/89.33 |
| 4,061,082 A | | 12/1977 | Shuler |
| 4,088,463 A | * | 5/1978 | Smith ..................... 55/480 |
| 4,371,386 A | * | 2/1983 | DeVecchi ................ 55/338 |
| 4,619,146 A | * | 10/1986 | Teodorescu et al. ...... 73/861.54 |
| 4,646,558 A | * | 3/1987 | Gualtieri et al. ............. 73/40.7 |
| 4,846,400 A | * | 7/1989 | Crouse ..................... 236/93 R |
| 5,244,480 A | | 9/1993 | Henry |
| 6,171,366 B1 | * | 1/2001 | Vicard et al. ................... 95/1 |
| 6,468,322 B1 | * | 10/2002 | Alvin et al. ................. 55/482 |
| 6,497,739 B2 | | 12/2002 | McGill |
| 6,770,108 B2 | * | 8/2004 | Cherry, Sr. .................. 55/385.2 |

FOREIGN PATENT DOCUMENTS

GB     2210169 A   *   9/1987

(Continued)

OTHER PUBLICATIONS

U.S. Appl. No. 10/863,629, filed Jun. 8, 2004, Morse et al.

(Continued)

*Primary Examiner*—Duane Smith
*Assistant Examiner*—Ives Wu
(74) *Attorney, Agent, or Firm*—Patterson & Sheridan, LLP.

(57) ABSTRACT

A filter module and method for facilitating rapid flow setting and/or cost-effective balancing of airflow through a plurality of filters is provided. In one embodiment, the filter module includes at least one port configured to provide a metric indicative of flow through the housing assembly. In various other embodiments, at least one port is utilized for sensing differential pressure across a flow restrictor, such as a damper assembly and/or a diffuser plate of the housing assembly, an orifice plate disposed in a collar or ductwork coupled to collar, and the like. In another aspect of the invention, a method for replacing an air filter is provided that includes the steps of replacing an air filter disposed in a filter housing assembly, and setting a damper position using a damper position indicator to return air flow through the filter to a predetermined rate.

13 Claims, 14 Drawing Sheets

FOREIGN PATENT DOCUMENTS

GB        2210169 A  *  1/1989

OTHER PUBLICATIONS

Isolation dampers, Rectangual Bubble-Tight, Product bulletin 3440S-0103, Camfil Farr, Inc. Washington, NC, © Camfil Farr, Date Unknown.

"Isolation Dampers Round," Product bulletin, 3440R-0103, Camfil Farr, Inc., Washington NC, © Camfil Farr, Date unknown.

"Pharmaseal", Product sheet 3420-0303, Camfil Farr, Inc. Washington NC, © Camfil Farr, Date Unknown.

"Iris-M Motorized Damper," CFM Air Control & Measurement, Buffalo, New York.

"Iris-S Stainless Steel Damper," CFM Air Control & Measurement, Buffalo, New York.

"Iris Damper," CFM Air Control & Measurement, Buffalo, New York.

International Search Report and Written Opinion for International Application No. PCT/US06/15524 dated Jan. 31, 2008.

* cited by examiner

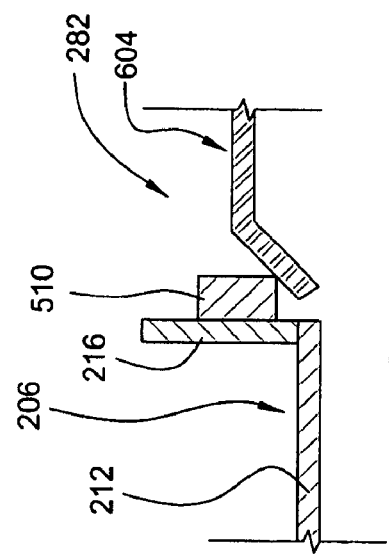
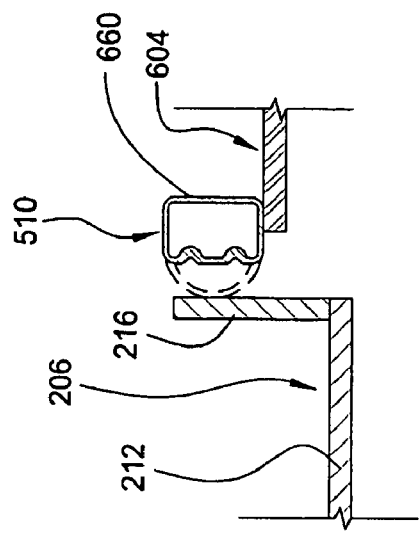
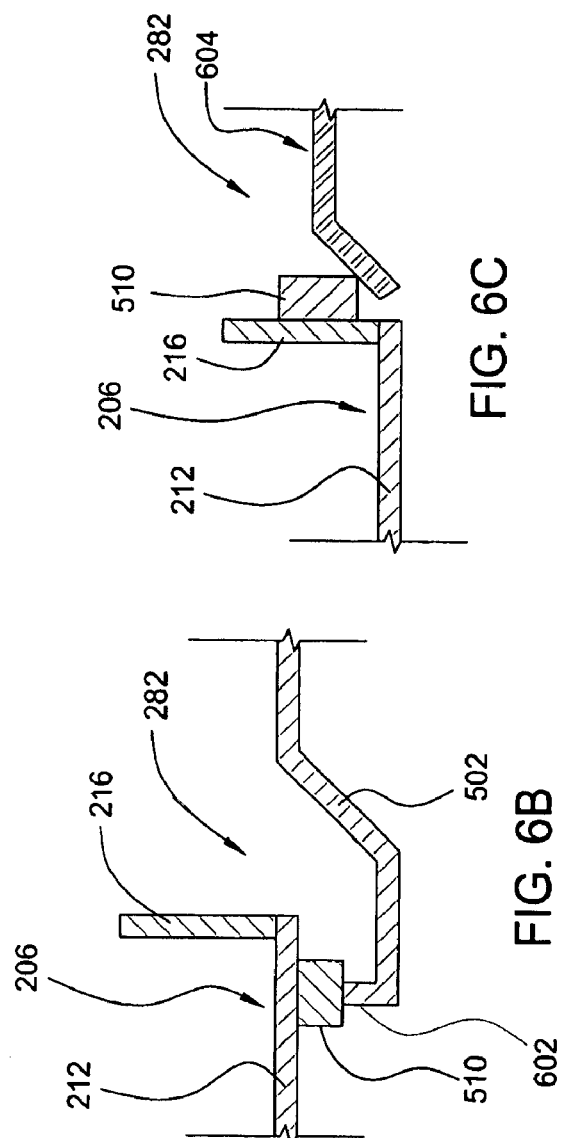
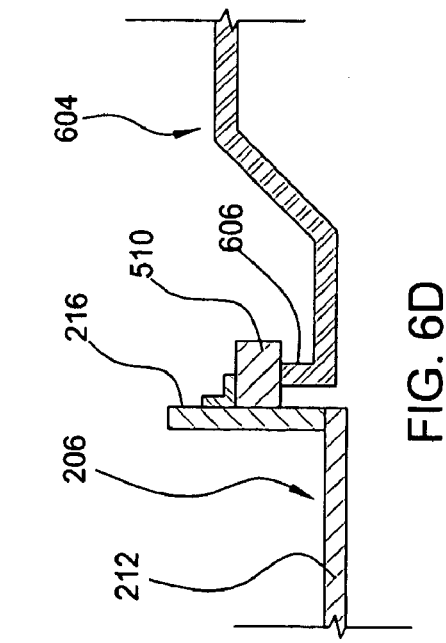
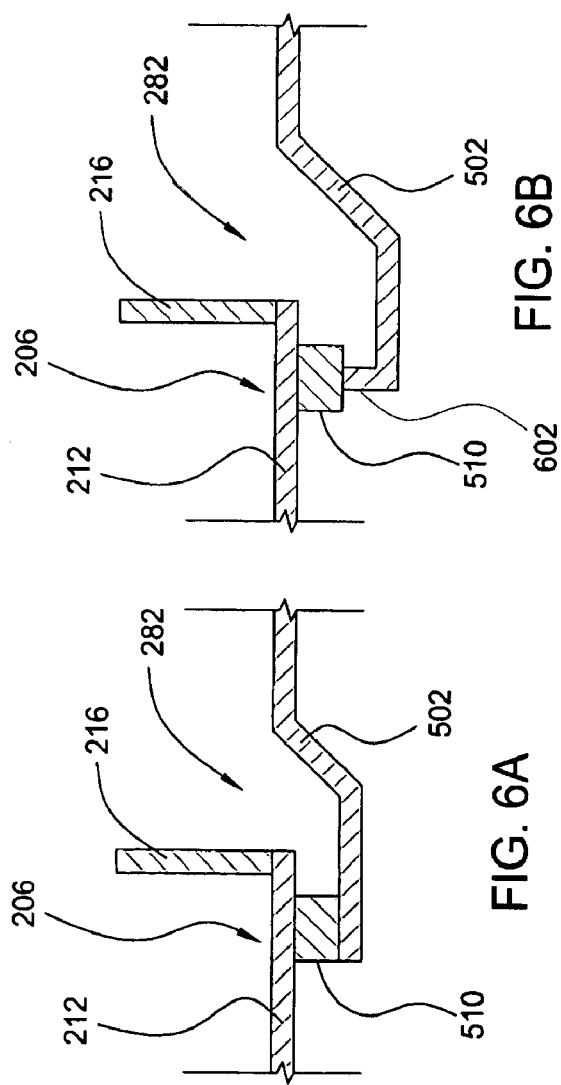

FILTER MODULE WITH FLOW CONTROL

BACKGROUND OF THE DISCLOSURE

1. Field of the Invention

The embodiments of the present invention relate generally to a filter housing assembly.

2. Background of the Invention

Clean rooms are utilized in many industries for contamination control and to improve product yields. A plurality of filters, typically mounted in the ceiling of the cleanroom, are configured to remove particulate from air entering the cleanroom at a predetermined efficiency selected based upon the cleanliness requirements of the activities performed in the cleanroom. As particulates load the filtration media disposed in the filter, the airflow through the filter decreases as the pressure drop across the filter increases. Once the filter reaches a critical pressure drop, the filter is typically replaced.

In other applications, replacement of filters is scheduled based on time or processes performed within the cleanroom. For example, in many pharmaceutical and biotech clean rooms, periodic replacement of filters is required to meet regulatory or owner specifications. To facilitate efficient replacement of the filter, a hood (housing) is typically mounted in the cleanroom ceiling in which the filter may be readily removed and replaced.

Ducted supply hoods with roomside replaceable filters are commonly used in pharmaceutical applications for cleaning supply air to cleanroom manufacturing and process areas, as well as to laboratory areas. Typically, a plurality of supply hoods are coupled to a blower by a duct network. The hoods are supplied with adjustable dampers that allow customers to regulate the airflow without having to remove the filter from the hood. The most common types of dampers are guillotine, opposed blade and butterfly types. Importantly, the dampers allow the air flow through each filter coupled to the duct network to be balanced individually to obtain a desired distribution of air flow entering the room through the various filters.

During operation of the cleanroom, the filter within the filter modules trap particulate and other matter, thereby increasing air flow resistance through the filter. Thus, if one filter requires replacement, the reduced resistance of the replacement filter relative to the other filters coupled to a common ductwork results in an increased airflow through the new filter and a corresponding reduction of air flow in the other filters. This unbalances the airflow distribution into the cleanroom, often to the point of non-conformance to room balancing criteria. To remedy this problem, the supply hoods coupled to the ductwork must be rebalanced.

As balancing the airflow requires accurately making airflow measurements and the damper adjustments over a repetitive cycle at each filter, the man-hours cost of balancing a room is high. Moreover, due to the repetitive nature of airflow measurement gathering and damper adjustment during the balancing procedure, balancing a room undesirably results in lost cleanroom operation time.

Therefore, there is a need for a filter module and method for replacing a filter that reduces the time required to balance airflow between a series of filter modules having a common air source.

SUMMARY OF THE INVENTION

A filter module and method for facilitating rapid flow setting and/or balancing of airflow through a plurality of filter modules is provided. In one embodiment, the filter module includes a housing having an opening adapted to receive a filter. An inlet collar is formed through the housing. The filter module contains at least one port configured to provide a metric indicative of flow through the collar. In various other embodiments, at least one port is utilized for sensing differential pressure across a flow restrictor, such as a damper assembly and/or a diffuser plate of the housing assembly, an orifice plate disposed in the collar or ductwork coupled to collar, and the like.

In alternate embodiments, the filter module may be configured to retain a roomside replaceable filter or a filter permanently adhered to the housing. The filter module may be utilized to supply and/or exhaust air from a work space, such as a cleanroom. The filter module may be alternatively be utilized in a containment system or other application. In various embodiments, a seal member of the damper assembly may be configured to provide a bubble-tight seal.

In another aspect of the invention, a method for replacing an air filter is provided. In one embodiment, the method includes the steps of replacing an air filter disposed in a filter housing assembly, and setting a damper position using a damper position indicator to return air flow through the filter to a predetermined rate. In another embodiment, the air flow is returned to the predetermined rate using a correlation between damper position and differential pressure of flow across a flow restrictor.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

FIG. 6A-E are various embodiments of a sealing element disposed between a housing assembly and a seal member;

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The invention generally provides a filter module and method for facilitating rapid flow setting and/or balancing of airflow through a plurality of filter modules. In most of the embodiments described herein, pressure drop across a flow restrictor positioned across the flow entering the filter module at a known damper position may be utilized to set the airflow through a filter module without use of flow measuring devices disposed downstream of the filter. For example, at each damper position, pressure drop across flow restrictor, such as the damper itself, or an orifice plate, diffuser plate, and the like, correlates to a specific flow rate through the filter module. The filter module of the present invention provides damper position information visible on the roomside of the filter module when the filter is installed. Thus, by knowing the damper position and the pressure drop, the flow through the filter module may be rapidly set to a predetermined rate. This is extremely advantageous for room balancing as the bulky flow measuring equipment is not needed to determine the flow rate. Additionally, as shroud-type flow measuring equipment that increases the backpressure through the filter is not required, the flow through the filter module may be more accurately set than as done using conventional filter balancing techniques.

Figure 1:
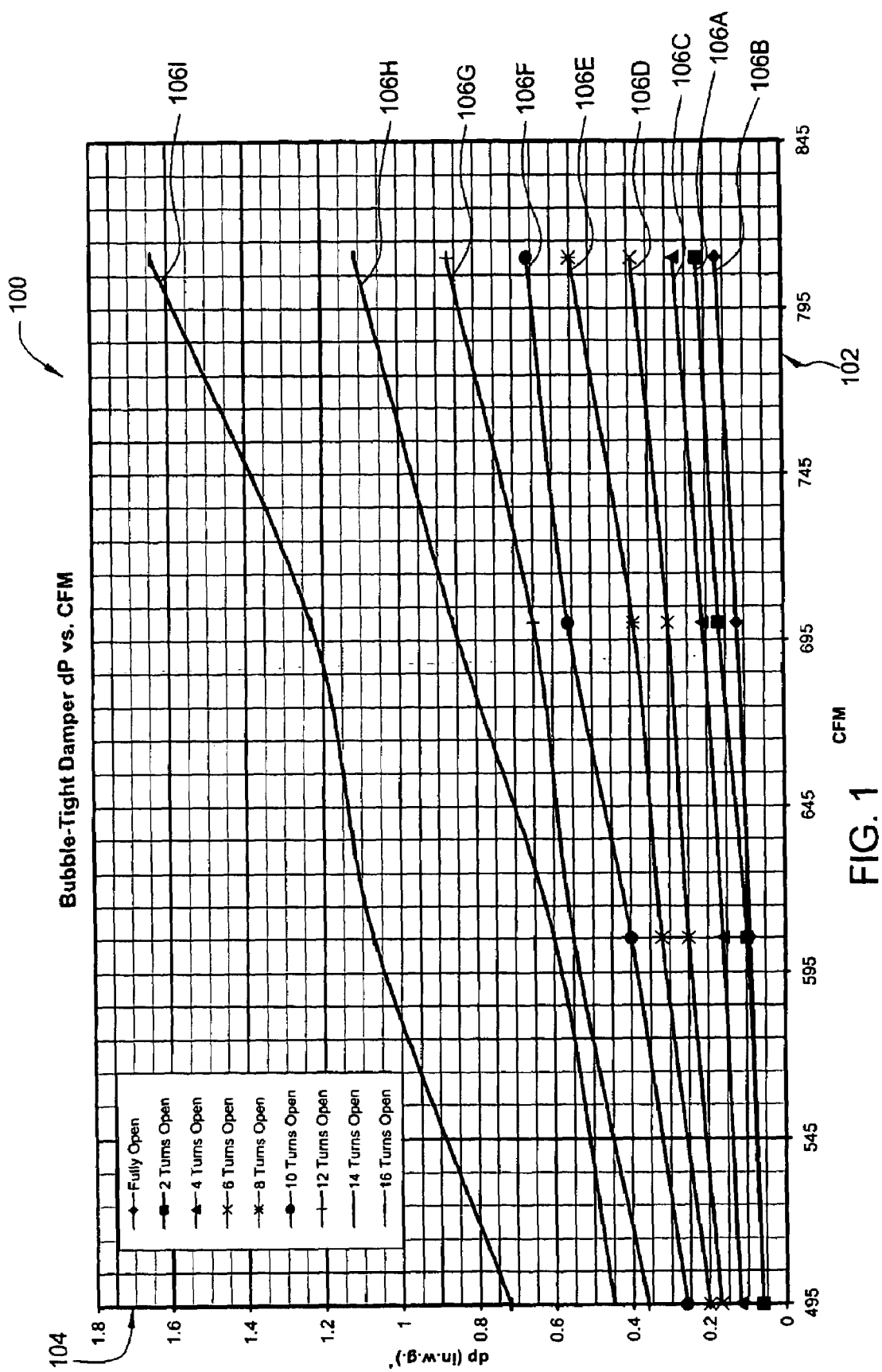
FIG. 1 is a graph of flow rate verse pressure drop (across a flow restrictor) for various damper positions of one embodiment of a filter module.

FIG. 1 is a graph 100 of flow rate verse pressure drop (across an orifice plate) for various damper positions. Flow rate plotted along the x-axis 102 while pressure drop is plotted along the y-axis 104. Plots 106A-I depict flow rates at various damper positions. Although the damper position is given in terms of "turns (or percent) from fully open or closed", the damper position may be determined through other methods/devices as discussed and shown in the embodiment below. Thus, the flow through the filter module may be set to a predetermine rate by adjusting the damper until the pressure drop at that position indicates the desired flow rate. This method is particularly advantageous when replacing a single filter as the reduced resistance of the replacement filter compared to the used (e.g., loaded) filter exhibits an increase flow rate at the same damper position, thereby unbalancing air flow into the room. Although setting the flow rate is illustrated using a series of curves, the information depicted on the graph 100 of FIG. 1 is contemplated as an algorithm, which may be utilized to automate setting the filter module flow rate and/or balancing air flow into a room.

Figure 2A:
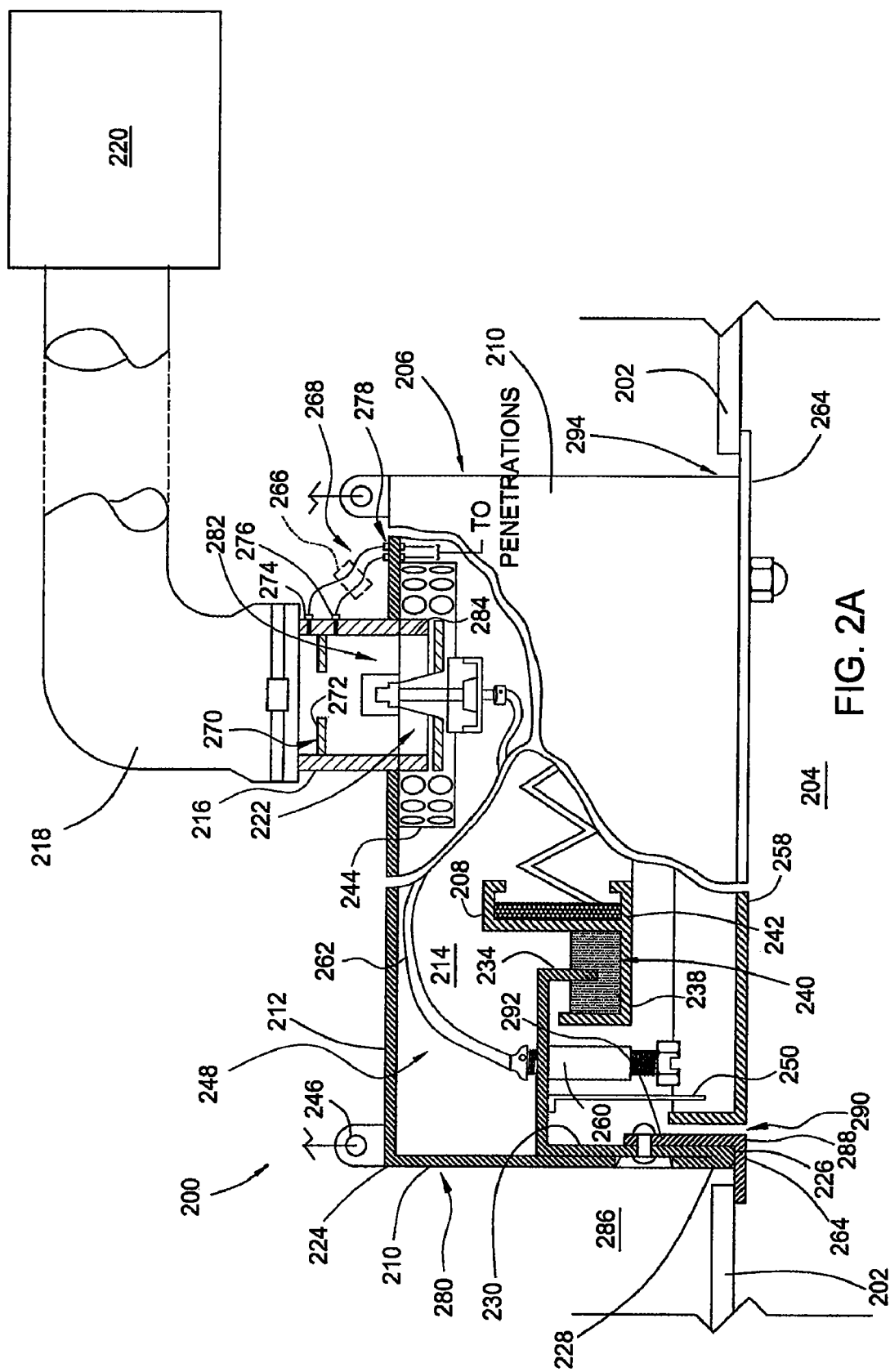
FIG. 2A depicts a simplified, partial sectional view of one embodiment of a filter module having a damper position indicator and a flow restrictor.

FIG. 2A depicts a sectional view of one embodiment of a filter module 200 of the present invention shown disposed in a ceiling 202 of a cleanroom 204. The filter module 200 includes a damper assembly 222, a damper position indicator 250 and an airflow indicator 270. The position indicator 250 is utilized with an adjustment mechanism 260 to selectively set the position of the damper assembly 222 such that airflow may be set to a predetermined rate. In one embodiment, the damper assembly 222 is configured to selectively prevent flow through the filter module 200 with a bubble-tight seal. Typically, additional filter modules 200 (not shown) are utilized in predetermined positions within the cleanroom 204 to provide predetermined levels of cleanliness and ventilation. The scale of FIG. 2A has been altered to allow selected details of the module 200 to be clearly shown in a single view.

The filter module 200 generally includes filter housing assembly 206 that retains a removable filter 208. The filter housing assembly 206 includes a filter housing 280 and a collar 216. The collar 216 may be an integral part of the housing 280 or separately coupled thereto, and facilitates coupling the filter housing assembly 206 to a duct 218 that supplies air from an air handler 220. The air handler 220 supplies air to the filter module 200. The air handler 220 includes one or more blowers or fans (not shown) and may additionally include pre-filtration elements such as ASHRAE or HEPA filters. It is also contemplated that the collar 216 may be coupled to an air return to exhaust the room throughout the filter 208.

The housing 280 has a plurality of sidewalls 210 and a backplate 212 that define an interior volume 214. It is contemplated that cylindrical housings may utilize a single sidewall 210. The sidewalls 210 and backplate 212 may be fabricated from a single element of materials, or may comprise separate components, sealingly coupled together.

The sidewalls 210 and backplate 212 of the housing assembly 206 are generally fabricated from metals, such as aluminum or stainless steel, or other materials such as plastic, or glass reinforced plastic, among others. The sidewalls 210 are generally configured in a polygonal form, typically square or rectangular. The sidewalls 210 are sealingly coupled together at their intersections, for example, by welding, riveting, soldering, adhering, bonding, caulking and the like. The backplate 212 is generally coupled to the sidewalls 210 in a similar fashion to make the housing assembly 206 leak-tight.

The backplate 212 includes an inlet 282 formed therethrough. The inlet 282 is circumscribed by the collar 216 and facilitates airflow into the interior volume 214 of the housing assembly 206. The collar 216 is typically cylindrical, but may alternatively be square, rectangular or have another shape. An optional lip 284 may extend into the interior volume 214 from the backplate 212 and circumscribes the inlet 282. The lip 284 is sealingly coupled to the backplate 212, for example, by welding or caulking. The lip 284 may be sealed to the backplate 212 by other methods. The lip 284 may alternatively be drawn, spun or otherwise formed from the backplate 212. In another embodiment, the lip 284 may be part of the collar 216. The lip 284 may be utilized to enhance the sealing attributes of the damper assembly 222 as discussed further below.

Figure 2B:
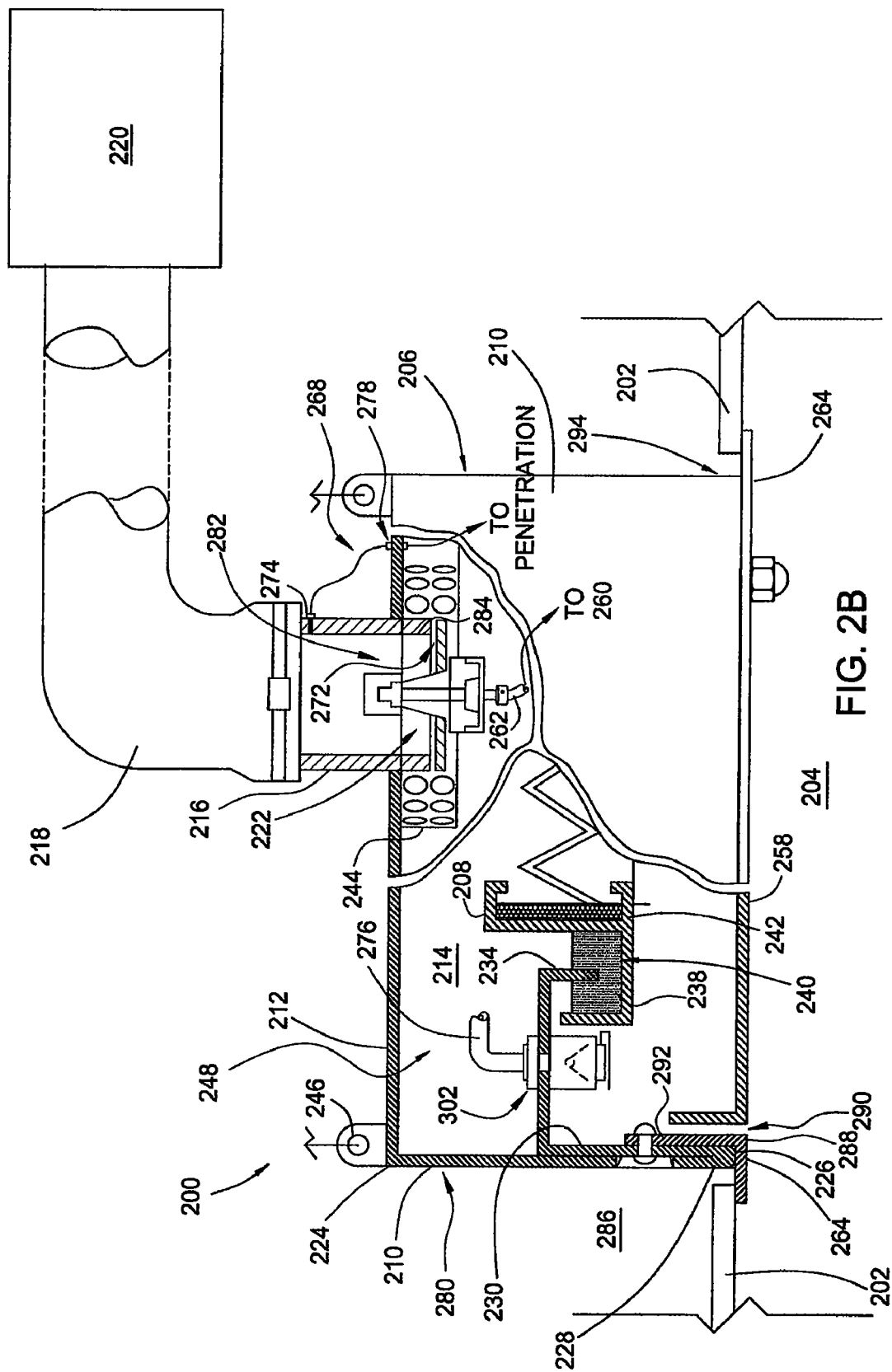
FIG. 2B is a partial, sectional view of another embodiment of a filter module having a flow restrictor.

In one embodiment, the backplate 212 includes at least one fitting 278 for coupling a sensor line between the flow indicator 270 and a penetration (shown as penetrations 302 in FIG. 3) in the filter module 200. In the embodiment depicted in FIG. 2A, the flow indicator 270 is in the form of a flow restrictor 272 mounted within the collar 216, such as an orifice plate. Upstream and downstream pressure ports 274, 276 are disposed in the collar 216 on either side of the flow restrictor 272 and coupled to the fittings 278 by a sensor line 268 in the form of a tube. It is contemplated that the flow indicator 270 may include other types of flow restricting element, such as the damper assembly itself or other filter housing component, wherein the pressure drop of the flow passing by the restricting element may be utilized to determine the flow rate. In embodiments where pressure drop through the variable gap or orifice (e.g., flow restrictor 272) defined by the damper assembly 222 is utilized as the flow indicator 270, the downstream pressure port 276 is positioned within the interior volume 214 of the housing assembly 206, separated from the upstream pressure port 274 by the damper assembly 222 as shown in FIG. 2B.

It is also contemplated that the flow indicator 270 may alternatively be in the form of a hot wire anemometer or other suitable airflow measuring device. It is also contemplated that the sensor lines 268 may be in the form of a wire for transferring a signal from an electronic pressure sensor 266 (shown in phantom in FIG. 2A) coupled to one or more of the ports 274, 276. The sensor 266 may provide a signal indicative of pressure (or flow) form one or both of the ports 274, 276, and in the embodiment depicted in phantom in FIG. 2A, the sensor 266 is a differential pressure transducer.

Returning to FIG. 2A, each sidewall 210 includes a first end 224 coupled to the backplate 212 and a second end 226 that interfaces with the cleanroom ceiling 202. The first end 224 of the sidewall 210 and/or backplate 212 generally includes a mounting pad or tab 246 that facilitates coupling the housing 206 to a supporting structure (not shown) above the cleanroom 204. The second end 226 defines an opening that accepts the filter 208 into the housing assembly 206.

The sidewalls 210 have a double wall that includes an outer section 228 disposed against at least a portion of an inner section 230. In the embodiment depicted in FIG. 2A, the outer section 228 is disposed between the first end 224 and the second end 226 while the inner section 230 extends from the second end 226 along a portion of the outer section 228 to a sealing section 232. The outer and inner sections 228, 230 are sealingly joined at the second end 226, and in one embodiment, are fabricated from a continuous piece or sheet of material where the outer section 228 is folded at the second end 226 and transitions into the inner section 230.

In one embodiment, the sealing section 232 includes a knife edge 234 that is coupled to the inner section 230 by a flange 236. Typically, the knife edge 234 and flange 236 are fabricated from a single piece of material, and may also be fabricated with the inner section 230 of the sidewall 210 as a continuous piece of material. The knife edge 234 is orientated substantially parallel to the sidewalls 210 and is configured to interface with a sealing element 238 disposed at one end the filter 208 to create an air-tight seal between the filter housing assembly 206 and the filter 208. Thus, the sealing section 232 separates the interior volume 214 of the housing assembly 206 into a plenum 248 upstream of the filter 208 and a downstream or roomside. In other words, the filter 208 interfacing with the sealing section 232 separates the unfiltered air upstream of the filter 208 with the clean, filtered air, downstream of the filter 208 that enters the cleanroom 204.

In the embodiment depicted in FIG. 2A, the sealing element 238 is a fluid seal, such as a silicon or polyurethane gel, disposed in a trough 240 formed in a frame 242 of the filter 208. The knife edge 234 penetrates the gel to create an air seal between the filter 208 and housing assembly 206. Filter performance (i.e., efficiency, pressure drop) is generally selected based on filtering and resistance criteria needed for a particular application to be performed in the cleanroom 204. Filters manufactured for this use are commercially available, e.g., from CAMFIL FARR, INC. located in Riverdale, N.J.

The sealing section 232 is generally wide enough on at least one side of the filter module 200 to accommodate a plurality of penetrations. The penetrations generally allow information, fluids, power and signal, and the like, to be accessed from the roomside of the filter module 200 without compromising the leak-tight integrity of the housing assembly and the filter to housing seal. In the embodiment depicted in FIG. 2A, the penetration shown is the damper adjustment mechanism 260, which is coupled to the damper assembly 222 by a power transmission device, such as a rotary cable 262.

Figure 3A:
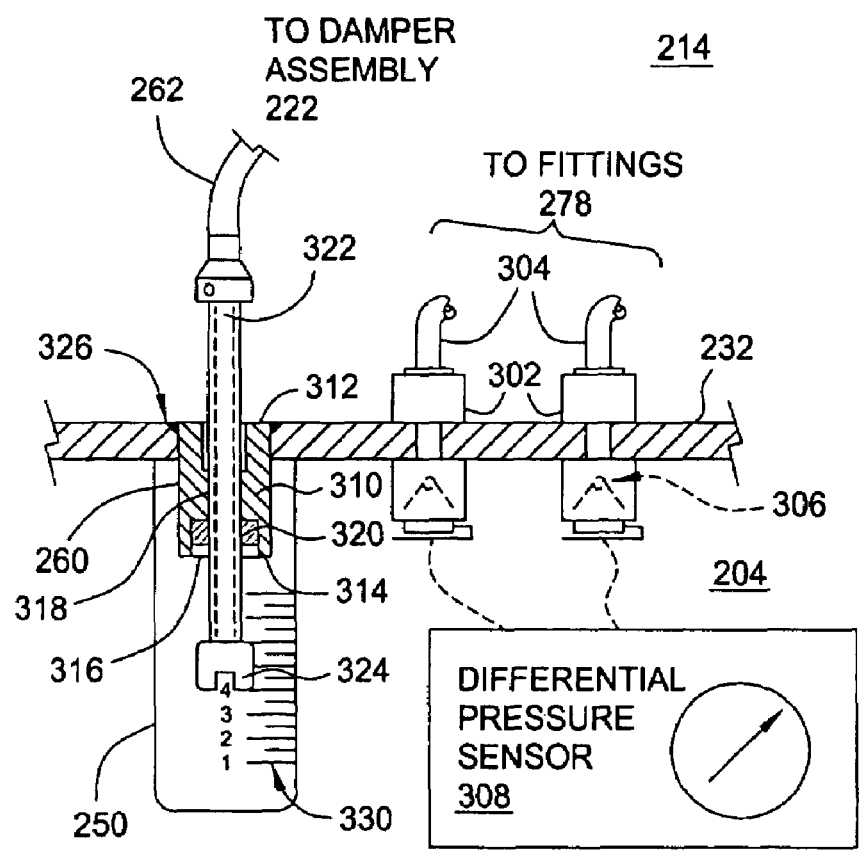
FIG. 3A is one embodiment of a sealing section of the filter module of FIG. 2A.

FIG. 3A is one embodiment of a sectional view through the sealing section 224 illustrating one embodiment of the damper adjustment mechanism 260, along with penetrations 302 for coupling sensor lines 304 to the bulkhead fittings 278 (shown in FIG. 2A). In one embodiment, the damper adjustment mechanism 260 includes a body 310 having a first end 312 and a second end 314. The body 310 is sealingly coupled to the flange sealing portion 232 by any suitable method, for example, by a continuous weld 326. The body 310 includes a threaded portion 318 that engages a threaded member 312 disposed through the adjustment mechanism 360. The second end 314 of the body 310 includes a bore 316. The bore 316 is at least partially filled with a packing material 320 suitable for preventing leakage between the interior volume 214 of the filter module 200 and the cleanroom 204. In one embodiment, the packing material 320 is vacuum grease. It is contemplated that other suitable materials may be used to prevent leakage through the body 310, such as o-rings, gels and the like.

The end of the member 322 disposed inside the filter module 200 is coupled to the damper assembly 222 by the rotary cable 262. The end of the threaded member 322 disposed on the cleanroom side of the sealing section 232 includes a head 324. The head 324 has a feature suitable for engaging a driving mechanism (i.e., a screw driver, hex driver and the like) to selectively rotate the threaded member 322 in the body 310 of the adjustment mechanism 260.

As the threaded member 322 is rotated, the threaded member 322 advances relative to the body 310, thereby causing the head 324 to move relative to the damper position indicator 250. The damper position indicator 250 includes a scale 330 to allow the technician to easily determine the position of the damper assembly 222. In the embodiment depicted in FIGS. 2-3A, the scale 330 is embossed in the position indicator 250 which is spot welded or otherwise secured to the housing assembly 206. Optionally, the damper position may be determined by counting the number of turns from a full open or full closed damper position.

Also depicted in FIG. 3A are penetrations 302. In one embodiment, the penetrations 302 are a quick disconnect suitable for coupling at least one sensor, such as a differential pressure sensor 308 disposed in the cleanroom 204 to the ports 274, 276 disposed on either side of the flow restrictor 272 (e.g., orifice plate as shown in FIG. 2A or the flow gap defined by the damper 222 in FIG. 2B). The penetrations 302 generally include an integral check valve 306 (shown in phantom) to prevent leakage through the penetrations 302 when not in use.

Figure 3B:
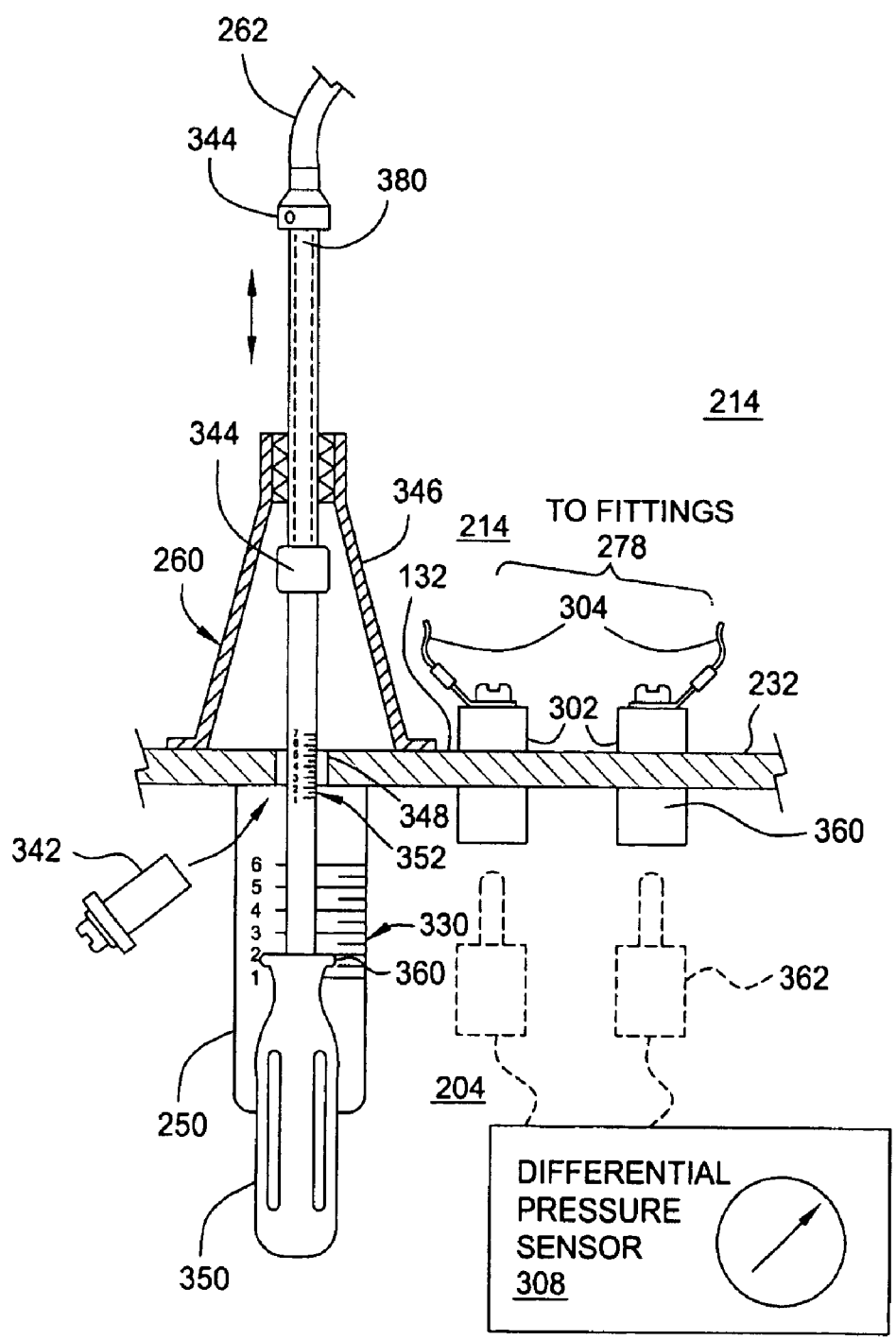
FIG. 3B is another embodiment of a sealing section.

FIG. 3B is a sectional view through the sealing section 232 illustrating another embodiment of the damper adjustment mechanism 260 along with penetrations 302 for coupling sensor lines 304 to the bulkhead fittings 278 shown in FIG. 2A. In the embodiment depicted in FIG. 3B, the adjustment mechanism 260 includes an adjustment tool 350 and a bracket 346 that retains a threaded member 380 in a predefined position in the interior volume 214 of the housing assembly 206. The threaded member 380 is coupled to a head 344 of the rotary cable 262. The adjustment tool 350 may be disposed through a hole 348 formed in a sealing section 232 to engage the threaded member 380. The tool 350 is adapted to selectively rotate the threaded member 380, and thus, the rotary cable 262 to control the damper position. As the cable 262 is rotated, the threaded member 380 advances in the bracket 346, and as such, the tool 350 advances into or out of the filter module depending on the direction of rotation. The relative position of the tool 350, and hence the condition of the damper assembly 222, may be determined by the relative position of a feature, such as the handle or scribe mark of the tool disposed on the tool 350 against the scale 330 in the position indicator 250. Alternatively, the position indicator 250 may be incorporated into the tool by disposing a scale depicted by reference numeral 352 on the tool itself. Thus, the position of the scale 352 relative to a feature of the housing assembly 206 (e.g., the sealing portion 232) is indicative of the position of the damper assembly 222. When the tool 350 is removed from the hole 348, the hole 348 may be sealed with an expandable plug 342.

Also shown in FIG. 3B is an alternative embodiment for the penetrations 302. The penetrations 302 depicted in FIG. 3B are illustrated as an electrical penetration disposed through the sealing portion 232. The penetrations 302 are configured to couple a sensor line 304, such as a signal wire, to the fittings 278 when an electrical signal is utilized as a metric of from the flow indicator 270. The portion of the penetrations 302 disposed on the cleanroom side of the filter housing 206 may have any configuration suitable for electrically connecting the sensor 308 to the ports 274, 276 positioned across the flow restrictor 272. Such penetrations 302 are also suitable for coupling for passing an electrical signal from a hot wire anemometer or a pressure sensor mounted above the ceiling 302 of the cleanroom to a meter or other device disposed in the cleanroom.

Figure 4:
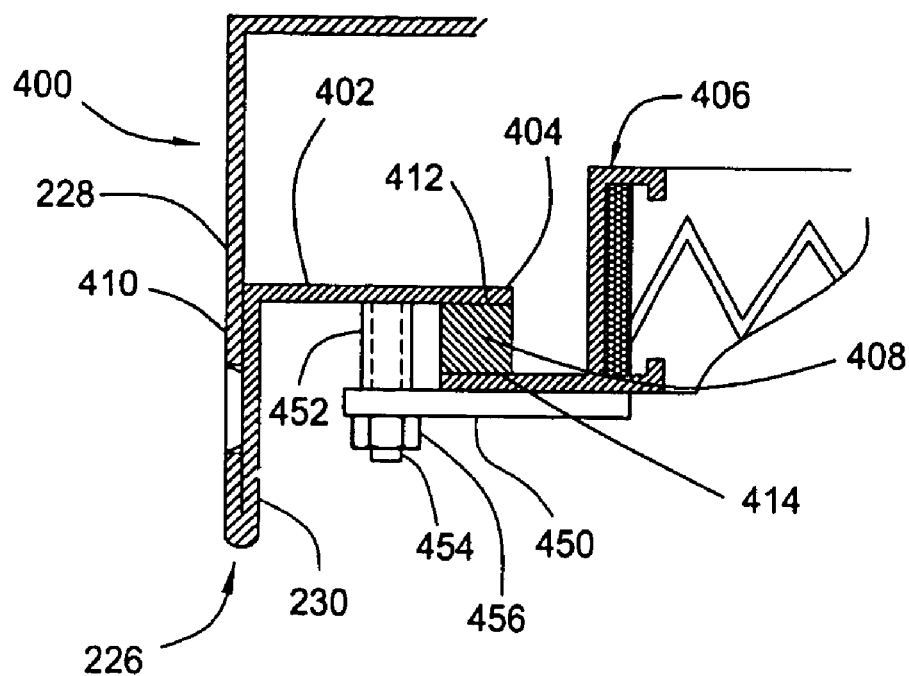
FIG. 4 a sectional view of a sealing section of another embodiment of a filter module.

FIG. 4 depicts another embodiment of a housing 400 having an alternative sealing section 402. Sidewalls 410 of the housing 400 are generally similar to the sidewalls 210 described above with reference to FIG. 2A. The sealing section 402 includes a flange 404 that extends perpendicularly inward from the inner section 230 of the sidewall 410 to provide a planar seating surface 412. A filter 406 having a gasket 408 disposed on top of a portion of a filter frame 414 is urged against the flange 404, thereby compressing the gasket 408 against the flange 404 to provide a seal between the housing 400 and filter 406. It is contemplated that the gasket 408 may be alternatively coupled to the flange 404 of the housing 400.

Also as shown in FIG. 4, the filter 406 may be secured to the housing 400 by a pawl tab 450 mounted on a standoff 452 coupled to the flange 404. The pawl tab 450 may be rotated about a stud 454 extending from the standoff 452 to provide clearance for removing/replacing the filter 406. Once the filter 406 is inserted into the housing 400, the pawl tab 450 is rotated to capture the filter 406 against the flange 404 (as shown). A locking nut 456 threaded on the stud 254 secures the pawl tab 250 in position. It is contemplated that the filter 208 may be retained to the housing 280 using other methods.

The stud 454 may optionally extend to about the second end 226 of the sidewalls 410 to facilitate coupling a perforated or expanded screen 258 (seen in FIG. 2A) across the open end of the housing 400. The screen 258 has a plurality of mounting holes configured to align with the studs 454. An acorn nut or other fastener may be coupled to the stud 454 to secure the screen 258 to the housing 400.

Returning to FIG. 2A, a trim ring 264 is disposed between an optional screen 258 and the housing assembly 206 to cover the interface of the housing assembly 206 and ceiling 202 of the cleanroom 204. Caulk, or other sealant (not shown) may be applied between the trim ring 264 and ceiling 202 to prevent leakage between the cleanroom and an unfiltered area 286 above the ceiling 202. In most applications, the pressure in the cleanroom 204 is greater than the pressure in the area 286 to prevent leakage from the area 286 into the cleanroom 204.

The trim ring 264 is generally comprised of stainless steel, aluminum or other rigid material. The trim ring 264 is comprised of a picture frame 288 defining an aperture 290 and having a flange 292 extending into the aperture 290 substantially perpendicular to the picture frame 288. In the embodiment depicted in FIG. 2A, the picture frame 288 is rectangular. The picture frame 288 is configured to extend from an inner surface of the inner section 230 of the sidewall 210 to cover a hole 294 in the ceiling 202 in which the housing assembly 206 is mounted.

The flange 292 is disposed against the inner surface of the sidewalls 210 when the trim ring 264 is mounted to the housing assembly 206. A fastener, such as a rivet, self-tapping screw or other device is disposed through the trim ring 264 and into the sidewall 210 to secure the trim ring 264 to the filter module 200.

The housing assembly 206 may include an optional diffuser plate 244 coupled to the housing 280 and extending into the interior volume 214 of the housing assembly 206. The diffuser plate 244 is typically configured to uniformly distribute air entering through the inlet 282 into the housing 280, such that a uniform airflow distribution through the filter 208 is realized. Generally, the diffuser plate 244 is positioned, sized and shaped to provide uniform aerosol and airflow uniformity for a predefined housing geometry. The diffuser plate 244 may be fabricated from a metal or plastic material, and may be slotted, perforated or expanded to allow at least some air flow therethrough.

The damper assembly 222 is mounted to the housing 280 and controls the flow of air into the interior volume 214. In the embodiment depicted in FIG. 2A, the damper assembly 222 is coupled to the backplate 212. Alternatively, the damper assembly 222 maybe coupled to the sidewalls 210 or the collar 216. The damper assembly 222 may be closed to substantially stop the air flowing into the housing assembly 206 during replacement of the filter 208. The damper assembly 222 may also be incrementally opened to balance the air flowing into the cleanroom 204 between other filters (not shown) providing air to the cleanroom 204.

Figure 5:
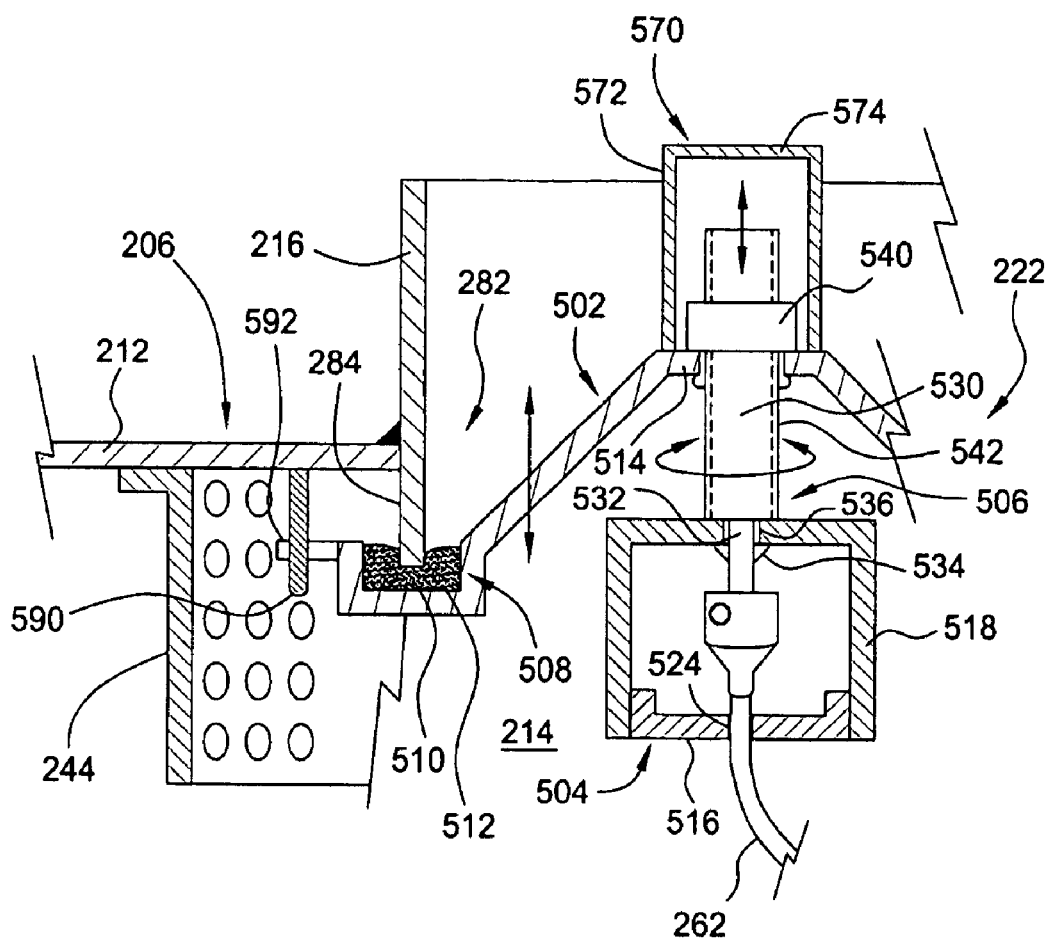
FIG. 5 is a partial sectional view of one embodiment of a damper assembly coupled to a housing assembly.

FIG. 5 is a partial sectional view of the housing assembly 206 illustrating one embodiment of the damper assembly 222. The damper assembly 222 includes a seal member 502 coupled to support member 504 by an adjustment mechanism 506. A sealing element 510 is disposed between the housing assembly 206 and the seal member 502. The adjustment mechanism 506 is adapted to move the seal member 502 between a first position that allows air (or other gas) into the internal volume 214 of the housing assembly 206 and a second position that prevents flow through the inlet 282 of the housing assembly 206. Accordingly, the adjustment mechanism 506 may be utilized to selectively control the spacing between the housing assembly 206 and the seal member 502, thereby controlling the flow of air through the inlet 282 and ultimately through the filter 208.

The seal member 502 is fabricated from a material non-permeable to air at pressure differentials typically encountered in ventilation systems. Materials suitable for fabricating the seal member include metals, such as aluminum or stainless steel, or other materials such as plastic, or glass reinforced plastic, among others. The seal member 502 is generally configured with a plan area larger than the diameter of the inlet 282. The seal member 502 may have polygonal, disk or other plan form.

The horizontal sectional profile of the seal member 502 may vary to provide a predetermined distribution of air flow and/or pressure within the internal volume 214 of the housing assembly 206. The seal member 502 may have a flat, conical, dome, bowl, convex, concave, spherical or other sectional shape. In the embodiment depicted in FIG. 5, the seal member 502 has a truncated cone shape.

The seal member 502 generally includes an outer portion 508 and a center portion 514. The outer portion 508 supports the sealing element 510 on a side of the seal member 502 facing the inlet 282. In the embodiment depicted in FIG. 5, a channel 512 is formed in the outer portion 508 of the seal member 502 to position the sealing element 510 in a predefined position relative to the inlet 282. For example, the channel 512 is substantially centered relative to the lip 284 that extends into the internal volume 214 of the housing assembly 206 so that the force per unit area of the lip 284 against the sealing element 510 ensures a bubble-tight seal of the inlet 282, thereby preventing flow into the housing assembly 206.

The sealing element 510 may be any material suitable for providing a bubble-tight seal between the seal member 502 and housing assembly 206. Examples of suitable sealing elements 510 include gaskets, gels and bladders, among others. Examples of suitable gasket materials include neoprene, foamed urethane, silicone, butyl, viton and the like. Examples of suitable gel materials include polymeric gel, polymeric thermoset gel, polymeric thermoplastic elastomer gel, silicon gel, polyurethane gel, and the like. In the embodiment depicted in FIG. 5, the sealing element is a polyurethane gel that allows penetration of the lip 284, thereby ensuring a bubble-tight seal.

It is contemplated that the sealing element 510 may be sealingly engaged by the housing assembly 206 and seal member 502 in other configurations. For example, the sealing element 510 may be coupled to at least one of the housing assembly 206 and seal member 502, and provide a bubble-tight seal without engaging a lip, as shown in FIG. 6A. In another example, the sealing element 510 may be coupled to the housing assembly 206 and engaged by a lip 602 extending from seal member 502, as shown in FIG. 6B. In yet another example, the sealing element 510 may be coupled to the housing assembly 206 within the collar 216 and engaged by a seal member 604 configured with a diameter less than the inlet 282, as shown in FIG. 6C. In still another example, the sealing element 510 may be engaged by a lip 606 extending from seal member 604, as shown in FIG. 6D. In another embodiment, the sealing member 604 may be coupled to the housing assembly 206 within the collar 216 and of a diameter less than the inside diameter of the collar 216. An inflatable gasket or bladder 660, coupled to at least one of the seal member 604 or collar 216, may be inflated and urged between the inside of the collar 216 and the seal member 604 as the seal element 510 to provide a bubble-tight seal, as shown in FIG. 6E.

The bubble-tight seal prevents air borne particles and contaminants from entering the cleanroom. The bubble-tight seal may be tested using pressure decay techniques, for example, as described in ASME N509-1989, Paragraph 5.9.7.3, which states that the damper seal shall be bubble tight when tested in the closed position at 10 inches water gage. Alternative seal criteria may include testing the bubble tight seal at a pressure between about 3 to 15 inches water gage. It is contemplated that alternative seal test criteria may be utilized.

Referring back to FIG. 5, the support member 504 includes a cross bar 516 and a mounting plate 518. The cross bar 516 is coupled to opposite sidewalls 210 of the housing 280. The mounting plate 518 is coupled to the center of the cross bar 516 and provides an anchor for the adjustment mechanism 506. In the embodiment depicted in FIG. 5, both the cross bar 516 and the mounting plate 518 have a "U" shaped cross section to limit deflection.

Figure 7:
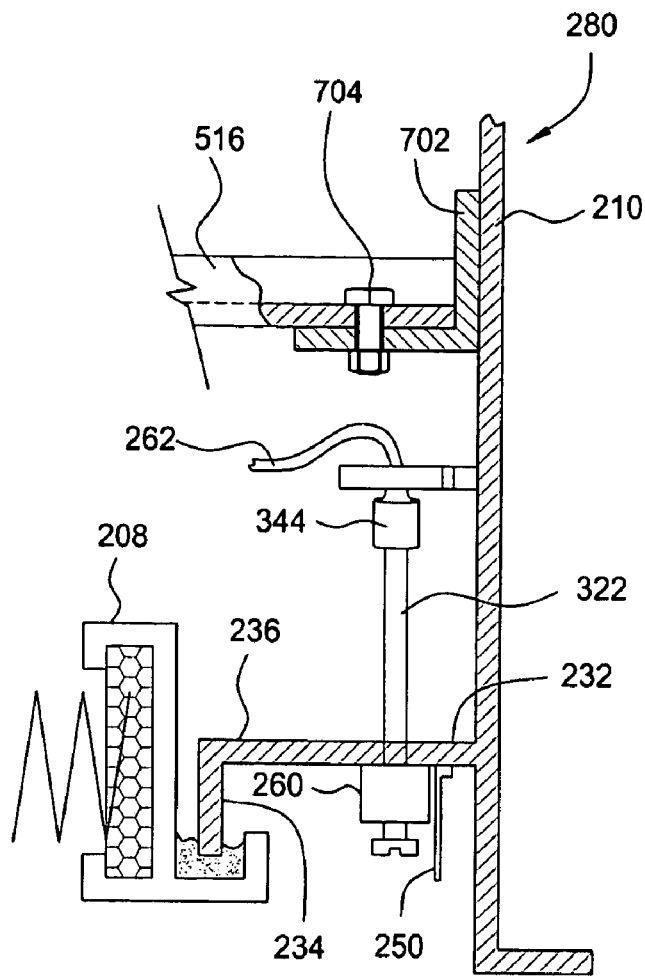
FIG. 7 is partial sectional view of the housing of FIG. 1.

Referring additionally to FIG. 7, the end of the cross bar 516 is coupled to a tab 702 that extends into the housing 280 from the sidewall 210. The opposite end of the cross bar 516 (not shown) is similarly attached to the opposite sidewall 210. The tab 702 may be coupled to the sidewall 210 by any method that does not generate a leak path into (or out of) the housing 280. In the embodiment depicted in FIG. 7, the tab 702 is welded to the housing 280. The cross bar 516 may be coupled to the tab 702 by any suitable method, such as welding, riveting fastening and the like. In the embodiment depicted in FIG. 7, the tab 702 is coupled to the cross bar 516 by a fastener 704, such as a machine screw and locknut, or rivet. Alternatively, the cross bar 516 may be coupled directly to the sidewall 210 and/or backplate 212 by any method that does not generate a leak path into (or out of) the housing 280.

The adjustment mechanism 506 is generally suitable to control the spacing between the seal member 502 and the inlet 282. Suitable adjustment mechanisms 506 include lead screws, ball screws, acme screws, linear actuators, electric motors, fluid cylinders, and mechanical linkages among others. In one embodiment, the adjustment mechanism 506 includes a lead screw 530, a drive nut 540 and the rotary cable 262. The rotary cable 262 is coupled to a shaft 532 extending from the lead screw 530 opposite the drive nut 540 and is utilized to rotate the lead screw 530, thereby controlling the position of the drive nut 540 along the lead screw 530.

The lead screw 530 is axially retained by and may rotate relative to the support member 504. In the embodiment depicted in FIG. 5, the shaft 532 of the lead screw 530 is disposed through a hole 536 formed in the top of the mounting plate 518. A threaded portion 542 of the lead screw 530 which engages the drive nut 540 has a larger diameter than the hole 536, thereby preventing the lead screw 530 from sliding through the hole 536 of the mounting plate 518. A retaining ring 534 may be disposed on the shaft 532 to capture the lead screw 530 to the mounting plate 518, thereby allowing the shaft 530 to rotate freely within the hole 536 without becoming disengaged from the support member 504. The rotary cable 262 is coupled to the shaft 532 and is routed to the adjustment mechanism 260 as shown in FIGS. 2-3B.

Figure 8:
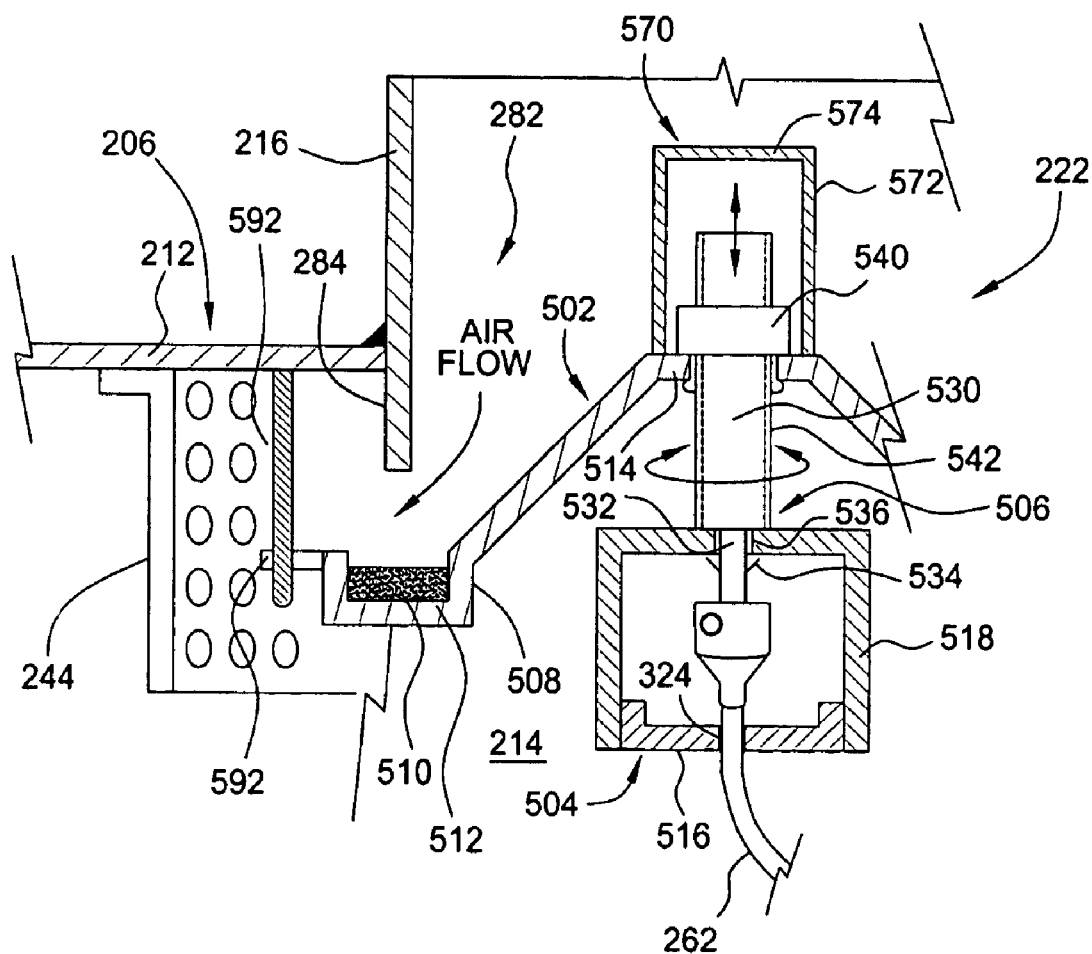
FIG. 8 is a partial sectional view of the damper assembly of FIG. 5 in an open position.

The drive nut 540 is coupled to the seal member 502 and is engaged by the lead screw 530. The drive nut 540 is coupled to the center portion 514 of the seal member 502. The drive nut 540 may be a weld nut, clinch nut, press nut or hole threaded into the seal member 502. The rotation of the seal member 502 is prevented by at least one pin 590 extending from the housing assembly 206 and engaging a hole or slot 592 formed in the seal member 502 radially outward of the sealing element 510. It is contemplated that the seal member 502 may be restrained from rotation by a tab or other geometry configured to engage the support member 504 in a manner that prevents rotation of the disk as the lead screw 530 is rotated. It is also contemplated that the seal member 502 may be restrained from rotation by anti-rotation geometry incorporated into the drive nut 540 and the lead screw 530. Thus, as the lead screw 530 is rotated, the restrained seal member 502 is moved between a second position sealing the inlet 282 (as shown in FIG. 5) and a first position spacing the sealing member 510 from the housing assembly 206 (as shown in FIG. 8), thereby selectively regulating flow through the inlet 282 and into the interior volume 214 of the housing assembly 206.

To prevent leakage into the housing assembly 206 between the drive nut 540 and the lead screw 530, a cover 570 is sealingly coupled to the seal member 502 opposite the cross bar 516. The cover 570 generally prevents air from passing through the interface between adjustment mechanism 506 and the seal member 502 while allowing adequate movement of the lead screw 530.

In the embodiment depicted in FIG. 5, the cover 570 is a cylinder 572 having a first end sealingly coupled to the seal member 502 and a second end sealed by a cap 574. The cylinder 572 has a predetermined length that allows the lead screw 530 to extend into the cylinder 572 to a depth unimpeded by the cap 574 to allow sufficient travel of the drive nut 540 along lead screw 530 in order to provide a predefined flow through the gap created between the seal member 502 and the housing assembly 206.

Figure 9:
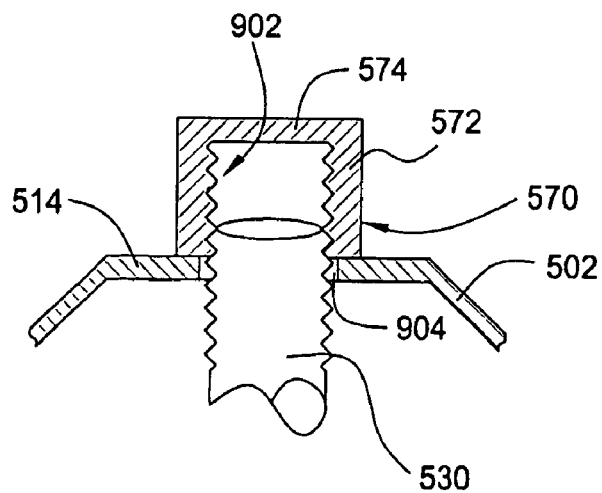
FIG. 9 depicts an alternative embodiment of a seal member and an adjustment mechanism.

Optionally, as shown in FIG. 9, the cylinder 572 may have a threaded interior 902 that engages the threaded portion 542 of the lead screw 530, thereby eliminating the need for a separate drive nut. In this embodiment, a clearance hole 904 is provided for the lead screw 530 in the center portion 514 of the seal member 502.

Figure 10:
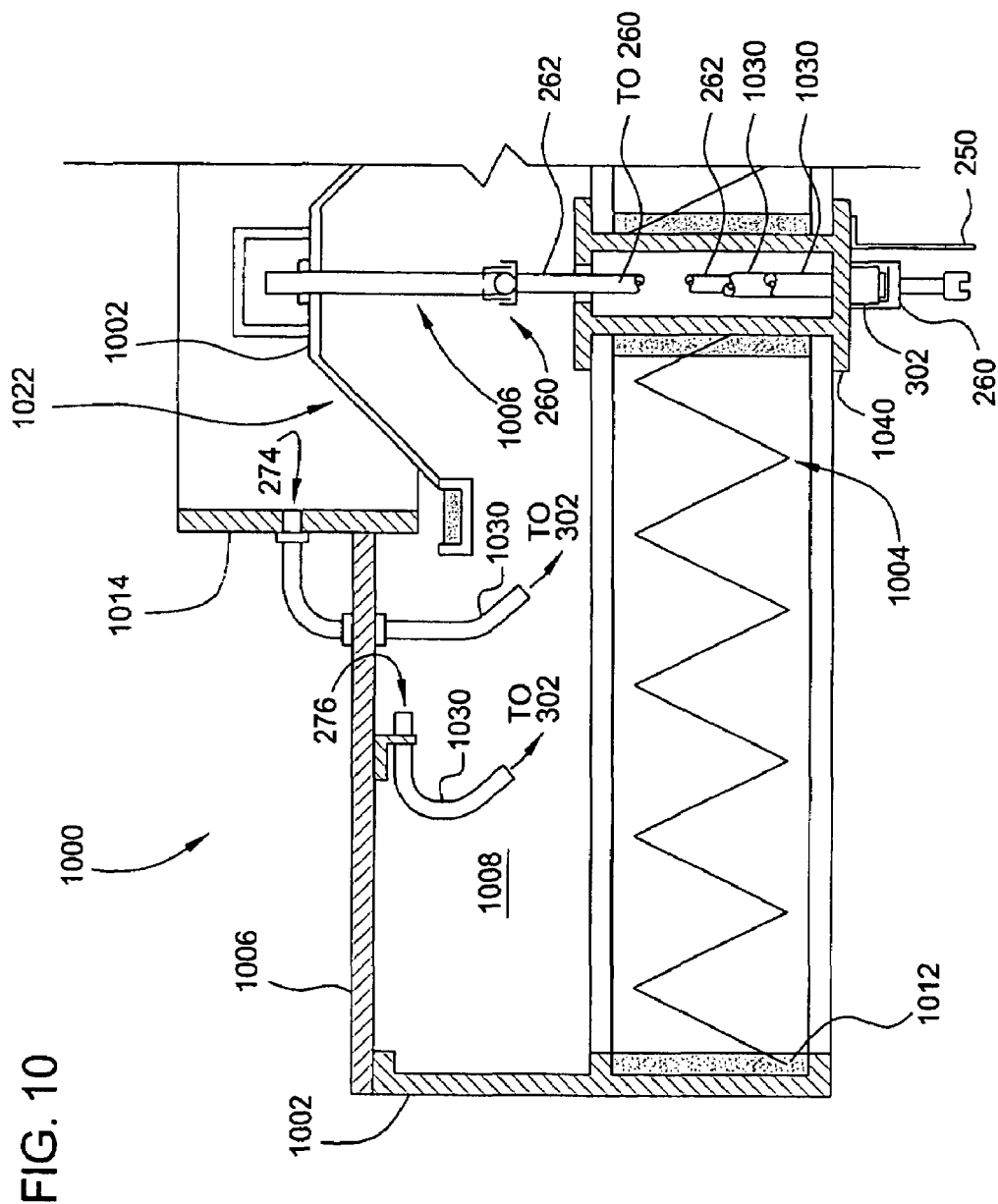
FIG. 10 depicts a sectional view of one embodiment of a diffuser having a damper assembly.

FIG. 10 depicts a filter module 1000 having a damper assembly 1022. The damper assembly 1022 may be suitable for providing a bubble-tight seal such as those described above and shown in FIG. 10, or may alternatively be a diffuser, such as a perforated plate and the like. The filter modules, also known in this configuration as diffusers, which may be adapted to benefit from the invention are generally available under the tradenames Laminar Flow Module, Laminar Flow Element and Laminar Flow Diffuser from CAMFIL FARR, INC., located in Riverdale, N.J.

The filter module 1000 generally includes a frame 1002 having a filter element 1004 permanently coupled thereto. In the embodiment depicted in FIG. 10, the filter element 1004 is bonded to the frame 1002 by a polyurethane adhesive 1012. A backplate 1006 is coupled to the frame 1002. The frame 1002 has a depth sufficient to maintain the backplate 1006 and filter element 1004 in a spaced-apart relationship, thereby defining a plenum 1008 within the filter module 1000. A collar 1014 is coupled to the backplate 1006 and circumscribes an inlet 1010 formed in the backplate 1006. The damper assembly 1022, which may be configured similar to the damper assemblies described above, is coupled to at least one of the backplate 1006, the frame 1002 or the collar 1014, and in one embodiment, is generally suitable for providing a bubble-tight seal of the inlet 1010 of the filter module 1000. Installing the bubble-tight damper 1022 in this configuration allows the site operator to seal the filter module 1000 prior to "fogging" an entire room or laboratory.

The module 1000 includes a flow indicator 270 in the form of a flow restrictor 272 (no items are labeled 272 in FIG. 10) and pressure ports 274, 276. The restrictor 272 is defined by the air flow gap defined by the position of the damper assembly 1022. The ports 274, 276 are generally positioned on the upstream and downstream side of the restrictor 272, and the in the embodiment depicted in FIG. 10, the upstream port 274 is positioned in the collar 1014 while the downstream port 276 is positioned within the interior volume 1008 of the module 100.

The ports 274, 276 are coupled to the roomside of the module 1000. In the embodiment depicted in FIG. 10, tubes 1030 couple the ports 274, 276 to penetrations 302 formed in a centerboard 1040 coupled to the frame 1002 and separating the filter element 1004. A penetration configured as an adjustment mechanism 260 is also coupled to the centerboard 1040.

Figure 11:
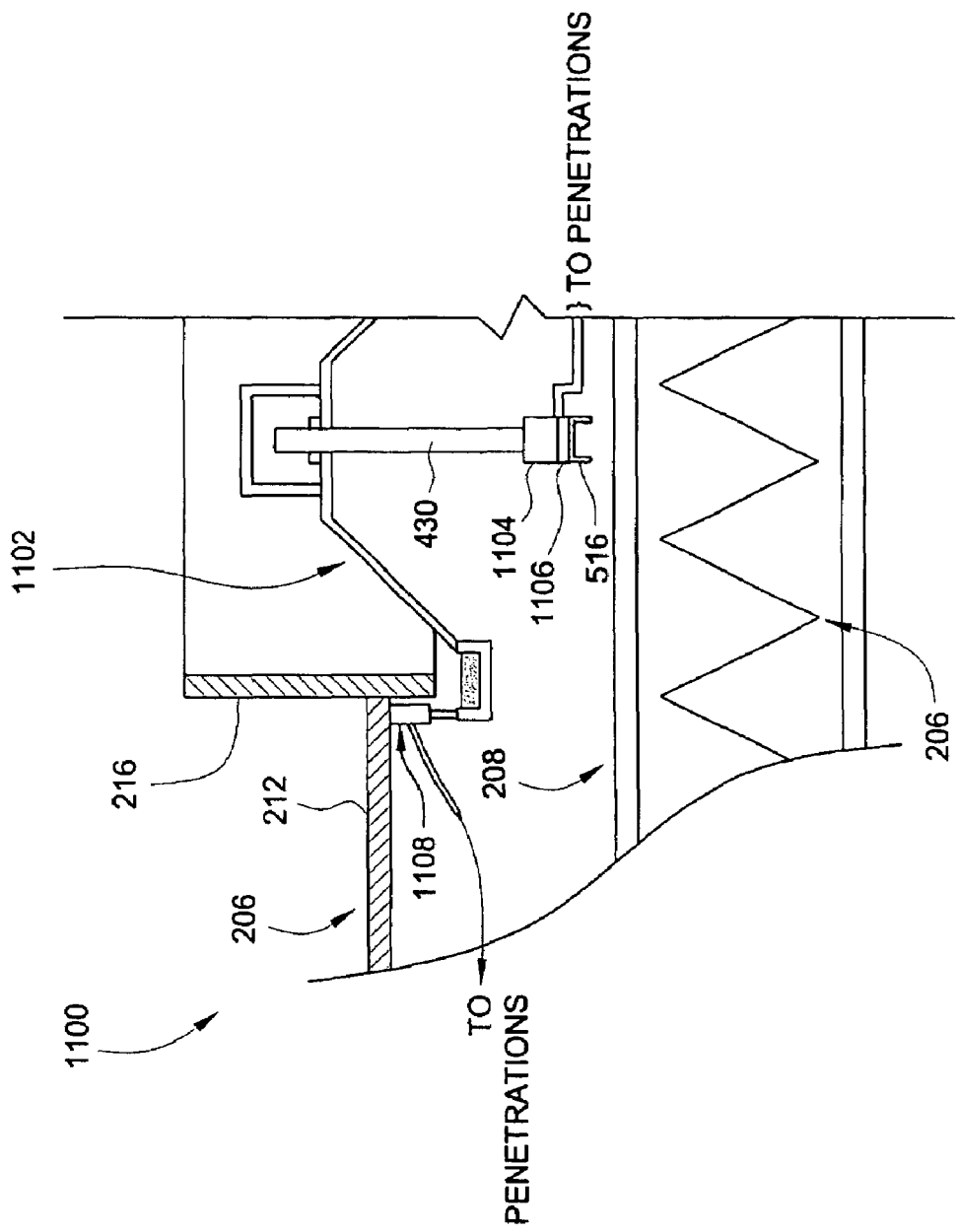
FIG. 11 is another embodiment of a filter module having a motorized damper assembly.

FIG. 11 is a partial sectional view of another embodiment of a filter module illustrating another embodiment of a damper assembly 1102. The damper assembly 1102 is substantially similar to the damper assemblies described above, except that the lead screw 430 is selectively rotated by a motor 1104 coupled to the housing 280. The motor 1104 may be a servo or stepper motor or other motor suitable for selectively positioning the damper assembly. In the embodiment depicted in FIG. 11, the motor 1104 includes an encoder 1106. The encoder 1106 provides a metric of motor position, and as such, may be used to provide a metric indicative of the damper position. Alternatively, a sensor 1108 may be provided to determine the damper position. The sensor 1108 may be a proximity sensor, optical sensor, linear displacement transducer or other sensor suitable for providing a metric indicative of the damper position. In the embodiment depicted in FIG. 11, the sensor 1108 is a linear displacement transducer.

Figure 12:
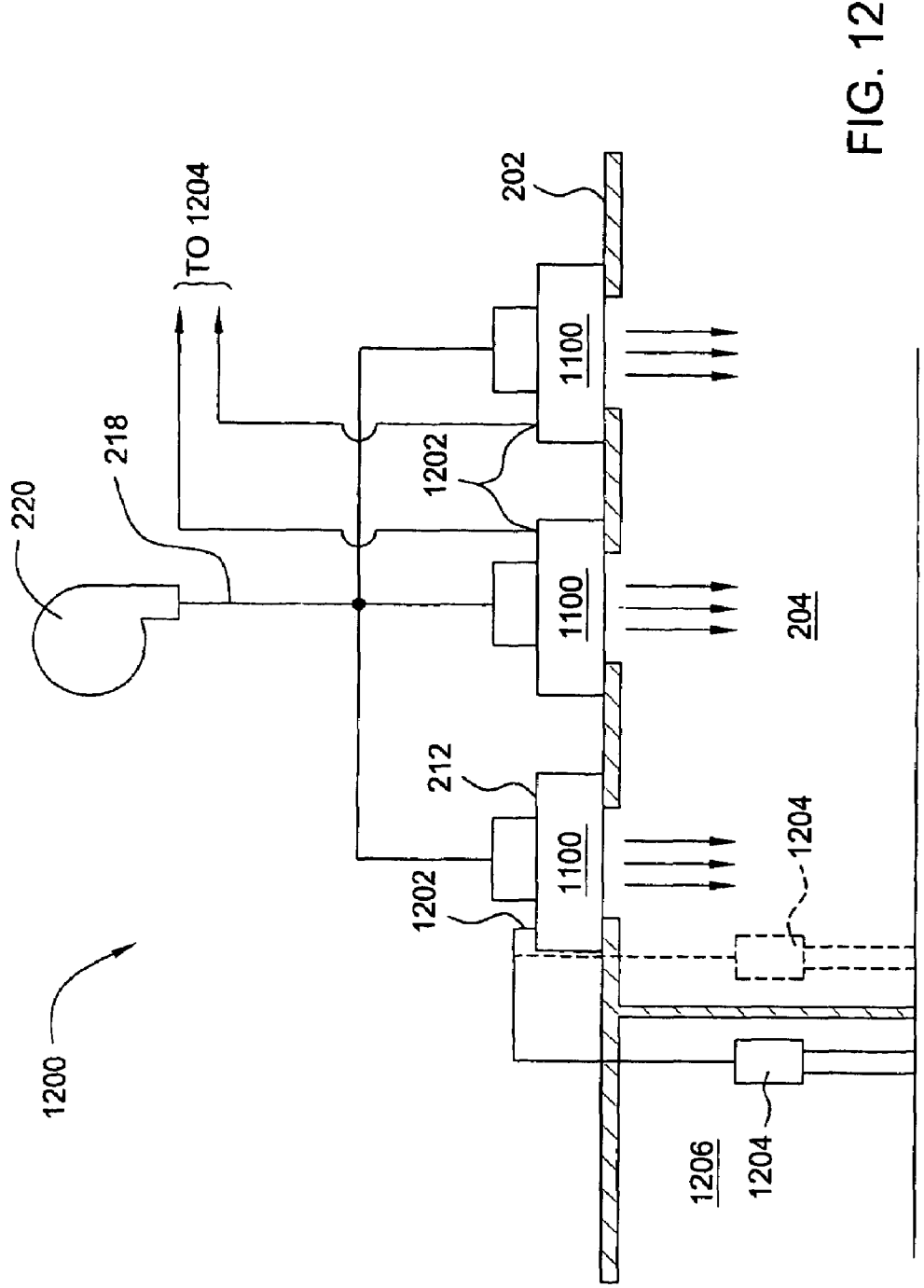
FIG. 12 a simplified, partial sectional view of a facility having a cleanroom with a plurality of filter modules of FIG. 11.

Connections for providing power control signals for sensor signals may be provided using penetrations 302 formed in the filter housing as shown in FIG. 3B. Alternatively, and as shown in FIG. 12, the penetrations 1202, similar to the penetrations 302, may be provided in the backplate 212 or other portion of the housing assembly 206, such that the controls signals, power or sensor output from the motor 1104, encoder 1106 and/or sensor 1108 may be routed above the ceiling 204 of the cleanroom 204 to a centralized control panel 1204 disposed in the cleanroom 204 (as shown in phantom) or other location within a facility 1200, such as an utility room 1206, located proximate the cleanroom 204. The panel 1204 may be located in other suitable locations.

From the control panel 1204, the pressure drop across the flow restrictor and with the damper position may be obtained, thereby enabling a technician in the utility room 1206 to set the flow in the filter module 1100, and/or remotely balance the air flow in the cleanroom 204 between filter modules 1100. Advantageously in this embodiment, technicians within the cleanroom solely are responsible for replacing the filter, while all flow control and balancing activity occurs remotely from the cleanroom. This method of flow control and balancing is particularly advantageous in cleanrooms where the decontamination of equipment leaving the clean room is required.

Figure 13:
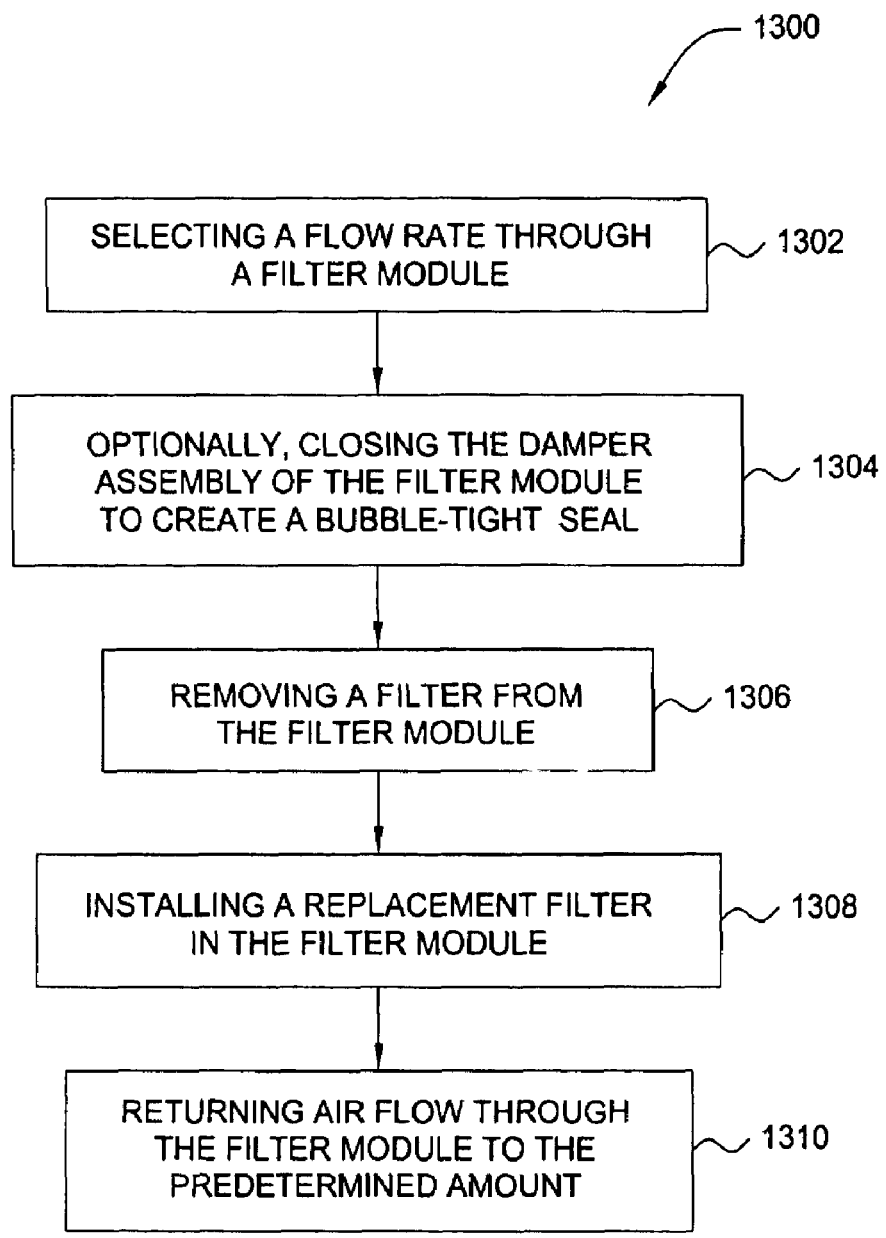
FIG. 13 is a flow diagram of one embodiment of a method for replacing a filter.

FIG. 13 is a flow diagram of one embodiment of a method 1300 for replacing a filter. The method 1300 begins at step 1302 by selecting a flow rate through a filter module 100. The flow rate may be selected by filter design criteria, clean room protocol, regulatory criteria or by determining an air flow currently passing through the installed filter 208, among other criteria. In one embodiment, the step 1302 of determining the air flow rate is performed by correlating the measured pressure drop across an orifice plate disposed in the collar of the filter module 100 or other flow restrictor at a known damper position, such as described with reference to FIG. 1. The damper position indication may be obtained using a damper position indicator 250, such as described with reference to FIGS. 3A-B. It is contemplated that the air flow rate may be determined using alternative methods, including damper adjustment turn counting, remote sensors, electric control, and the like.

At optional step 1304, the damper assembly 222 is closed to create a bubble-tight seal, thereby preventing air from entering the cleanroom 204 when the filter 208 is removed at step 1306. Following removal of the filter 208 at step 1306, a replacement filter is installed in the housing assembly 206 at step 1308.

At step 1310, the air flow through the filter module 100 is returned to the predetermined amount. In one embodiment, the predetermined rate of air flow is equal to the air flow rate through the removed filter as determined at step 1302.

In one embodiment, step 1310 may be performed by adjusting the damper position until the pressure differential across the flow restrictor indicates the desire flow rate for that damper position. This determination may be made by using a graph of static pressure versus flow for various damper positions as shown in FIG. 1.

Thus, a filter module that enables rapid and cost-effective balancing of airflow through a plurality of filters has been provided. A method for setting the filter module has been provided that provides accurate air flow measurement without the use of conventional shroud-type measuring equipment, and allow an air flow rate through the filter module to be efficiently returned to the pre-filter change out rate with minimal effort and equipment within the cleanroom.

Although the embodiments depicted above are described for use in cleanroom applications, the housing may be utilized equally effective as a housing for ASHRAE filters, filters of HEPA and higher efficiency, filters of sub-HEPA and low efficiency, carbon absorption products and the like. It is additionally contemplated that the filter housing may be utilized as an air return, wherein the filter is positioned upstream of the damper assembly. Moreover, embodiments having a bubble-tight damper assembly seal allow the cleanroom or work area to be advantageously isolated by the filter module, thereby facilitating maintenance of the ventilation system, decontamination of the work area, and the like, to be preformed without exposing the work area to contaminants upstream of the filter module, in the case of supply applications, or downstream of the filter module, in the case of exhaust applications.

Although various embodiments which incorporate the teachings of the present invention have been shown and described in detail herein, those skilled in the art can readily devise many other varied embodiments that still incorporate these teachings.

What is claimed is:

1. A filter module comprising:
   a filter housing having a collar;
   a damper coupled to the filter housing and adapted to regulate flow through the collar;
   a damper position indicator configured to indicate a flow rate through the collar, wherein the damper position indicator comprises a scale secured to the filter housing;
   a damper adjustment mechanism accessible from an exterior of the filter housing, wherein the damper adjustment mechanism comprises a threaded member accessible from the exterior of the filter housing, the damper adjustment mechanism configured to set the flow rate of the flow through the collar by adjusting the threaded member of the damper adjustment mechanism relative to the scale of the damper position indicator;
   a filter element sealingly engaged with the filter housing;
   at least one port configured to provide a metric indicative of the flow through the collar;
   a first port arranged to provide access to a metric indicative of pressure upstream of a flow restriction from the exterior of the filter housing;
   a second port arranged to provide access to a metric indicative of pressure downstream of the flow restriction from the exterior of the filter housing;
   a first penetration formed through the filter housing adjacent the filter element and coupled to the first port, the first penetration configured to permit communication from the first port without providing a leak path thought the filter housing; and
   a second penetration formed through the filter housing adjacent the filter element and coupled to the second port, the second penetration configured to permit communication from the second port without providing a leak path thought the filter housing.

2. The filter module of claim 1, wherein the damper is engageable with the filter housing to form a bubble-tight seal.

3. The filter module of claim 2, wherein the bubble-tight seal further comprises:
   a fluid seal.

4. The filter module of claim 1, wherein the filter element is removable from the filter housing.

5. The filter module of claim 1, wherein the filter element is adhered to the filter housing.

6. A filter module comprising:
   a filter housing having a collar;
   a damper coupled to the filter housing and adapted to regulate flow through the collar;
   a damper position indicator configured to indicate a flow rate through the collar;
   a damper adjustment mechanism accessible from an exterior of the filter housing, wherein the damper adjustment mechanism is configured to set the flow rate of the flow through the collar by adjusting the damper adjustment mechanism relative to the damper position indicator;
   a filter element sealingly engaged with the filter housing;
   at least one port configured to provide a metric indicative of the flow through the collar;
   a tool adapted to engage the damper adjustment mechanism to control a position of the damper through the filter housing; and
   a scale disposed on the tool, wherein a position of the scale relative to a feature of the filter housing is indicative of the position of the damper.

7. The filter module of claim 1 further comprising:
   a flow restriction disposed in the filter housing; and
   a differential pressure sensor arranged to detect a pressure drop across the flow restriction.

8. The filter module of claim 1 further comprising: a motor disposed in the filter housing and operably coupled to the damper.

9. The filter module of claim 1 further comprising:
   a variable flow restriction disposed in the filter housing; and
   means for measuring pressure drop across the variable flow restriction.

10. A method for replacing a filter from a filter module, comprising:
    determining a flow rate;
    removing the filter from the filter module;
    installing a replacement filter in the filter module; and
    positioning a damper using a damper position indicator to set air flow through the filter module to the determined flow rate.

11. The method of claim 10, wherein positioning the damper further comprises:
    viewing the damper position indicator from a roomside of the filter module with the filter installed.

12. The method of claim 10, wherein filter module comprises:
    a filter housing having a collar, the damper coupled to the filter housing and adapted to regulate flow through the collar;
    a damper adjustment mechanism accessible from an exterior of the filter housing, wherein the damper adjustment mechanism is configured to set the flow rate of the flow through the collar by adjusting the damper adjustment mechanism relative to the damper position indicator; and
    at least one port configured to provide a metric indicative of the flow through the collar.

13. The method of claim 10, wherein filter module comprises:
    (a) a filter housing having a first side and a second side, the second side configured to sealingly engage with a filter element;
    (b) an airflow inlet formed on the first side;
    (c) a flow regulating device coupled to the filter housing and adapted to regulate flow through the filter housing, wherein the flow regulating device comprises:
       the damper adjustably positioned near the airflow inlet; and
       a damper position indicator visible from the second side of the filter housing, wherein the damper position indicator is configured to indicate a flow rate through the filter housing from the airflow inlet;
    (d) a first port and a second port arranged to provide a metric of pressure drop across the flow regulating device; and
    (e) the filter element sealingly engaged with the filter housing on the second side.

* * * * *

UNITED STATES PATENT AND TRADEMARK OFFICE
CERTIFICATE OF CORRECTION

PATENT NO. : 7,517,386 B2
APPLICATION NO. : 11/118532
DATED : April 14, 2009
INVENTOR(S) : Morse It is certified that error appears in the above-identified patent and that said Letters Patent is hereby corrected as shown below:

In column 13, line 43, claim 1 delete "thought" and insert -- through --, therefor.

In column 13, line 49, claim 1 delete "thought" and insert -- through --, therefor.

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,517,386 B2                                    Page 1 of 1
APPLICATION NO. : 11/118532
DATED                 : April 14, 2009
INVENTOR(S)       : Morse It is certified that error appears in the above-identified patent and that said Letters Patent is hereby corrected as shown below:

In column 14, line 34, claim 12 insert --the--, before "filter".

In column 14, line 47, claim 13 insert --the--, before "filter".

In column 14, line 55, claim 13 insert --which is--, before "adjustably".

In column 14, line 57, claim 13 delete "a" and insert --the--, therefor.

In column 14, line 57, claim 13 insert --which is--, before "visible.".

Signed and Sealed this

Fifth Day of January, 2010

David J. Kappos
*Director of the United States Patent and Trademark Office*